(12) United States Patent
Murray

(10) Patent No.: US 7,895,298 B1
(45) Date of Patent: Feb. 22, 2011

(54) PUBLICLY ACCESSIBLE DELIVERY CONFIRMATION SYSTEM FOR VIRTUAL DIGITAL DOWNLOAD ITEMS

(75) Inventor: Duane Allen Murray, 1325 NW. 23rd St., Corvallis, OR (US) 97330

(73) Assignee: Duane Allen Murray, Corvallis, OR (US)

( * ) Notice: Subject to any disclaimer, the term of this patent is extended or adjusted under 35 U.S.C. 154(b) by 158 days.

(21) Appl. No.: 12/381,387

(22) Filed: Mar. 10, 2009

Related U.S. Application Data

(60) Provisional application No. 61/069,507, filed on Mar. 14, 2008.

(51) Int. Cl.
*G06F 15/16* (2006.01)

(52) U.S. Cl. ...................... 709/219; 709/224

(58) Field of Classification Search ......... 709/200–203, 709/217–227
See application file for complete search history.

(56) References Cited

U.S. PATENT DOCUMENTS

| | | | |
|---|---|---|---|
| 5,057,935 A * | 10/1991 | Williams | ..................... 358/402 |
| 6,181,700 B1 | 1/2001 | Doi | |
| 6,477,243 B1 | 11/2002 | Choksi et al. | |
| 6,618,747 B1 | 9/2003 | Flynn et al. | |
| 6,751,296 B1 | 6/2004 | Albal et al. | |
| 6,792,544 B2 | 9/2004 | Hashem et al. | |
| 6,823,366 B1 | 11/2004 | Nakano | |
| 6,823,367 B1 | 11/2004 | Wakasugi et al. | |
| 6,865,560 B1 | 3/2005 | Sansone et al. | |
| 6,898,625 B2 | 5/2005 | Henry et al. | |
| 6,945,458 B1 | 9/2005 | Shah et al. | |
| 6,978,929 B2 | 12/2005 | Buie et al. | |
| 7,113,948 B2 | 9/2006 | Jhingan et al. | |
| 7,197,537 B2 | 3/2007 | Koch | |
| 7,374,085 B2 | 5/2008 | Mukai | |
| 7,444,298 B2 | 10/2008 | Gilberto et al. | |
| 7,447,743 B1 | 11/2008 | Jordan et al. | |
| 2001/0014884 A1* | 8/2001 | Dillard et al. | ................. 705/57 |
| 2002/0087347 A1* | 7/2002 | Mano et al. | ................... 705/1 |

OTHER PUBLICATIONS

Information Sciences Institute, RFC 793—Transmission Control Protocol, Sep. 1981, University of Southern California, US.
Postel & Reynolds, Network Working Group, RFC 959—File Transfer Protocol, Oct. 1985, US.
R. Fielding et al., Network Working Group, RFC 2616—Hypertext Transfer Protocol, Jun. 1999, US.

\* cited by examiner

*Primary Examiner*—Moustafa M Meky

(57) ABSTRACT

A contents delivery confirmation system which includes a private client machine (3) that executes a browser (15) capable of requesting contents and a slave server machine (2) that executes a WWW server (12) capable of transmitting the contents requested by the private client machine (3) to the private client machine (3), a master server machine (1) that includes a delivery confirmation code issuance module (7) for issuing unique delivery confirmation codes for each request from slave server machines (2) in proxy for private client machines (3) requesting delivery of digital content, and browser (15) capable public client machines (4) used to view status and details of a delivery confirmation code. The master server machine (1) further includes a delivery confirmation receiving part (8) for receiving fault-tolerant delivery confirmation data containing the delivery confirmation code and updating the status of the delivery confirmation code from the slave server machine (2) when the slave server machine (2) completes delivery of a digital item to the private client machine (3). The master server machine (1) contains the status and details of all delivery confirmation codes for lookup by public client machines (4).

2 Claims, 12 Drawing Sheets

```
<?php //0035e
if(!extension_loaded('ionCube
Loader')){$__oc=strtolower(substr(php_uname(),0,3));$__ln='/ioncube/ioncube_
loader_'.$__oc.'_'.substr(phpversion(),0,3).(($__oc=='win')?'.dll':'.so');$_
_oid=$__id=realpath(ini_get('extension_dir'));$__here=dirname(__FILE__);if(s
trlen($__id)>1&&$__id[1]==':'){$__id=str_replace('\\','/',substr($__id,2));$
__here=str_replace('\\','/',substr($__here,2));}$__rd=str_repeat('/..',subst
r_count($__id,'/')).$__here.'/';$__i=strlen($__rd);while($__i--
){if($__rd[$__i]=='/'){$__lp=substr($__rd,0,$__i).$__ln;if(file_exists($__oi
d.$__lp)){$__ln=$__lp;break;}}}@dl($__ln);}else{die('The file '.__FILE__.'"
is corrupted.\n");}if(function_exists('_il_exec')){return
_il_exec();}echo('Site error: the file <b>'.__FILE__.'</b> requires the
ionCube PHP Loader '.basename($__ln).' to be installed by the site
administrator.');exit(199);
?>
4+oV5Bha190xJ/sdrbEHiwHWZQEVUqa6aSOMw8Qi3auznfViQVgYkBuYAKNxlJis9397j4gFTWaU
T52Cpy+Q7CrMin5sktv5k71Z3LSFvCSWLztU+8us/fLR1kARrmKPuqcwRKISzh4c5DY5VJu9BVjp
NaSLIaniV9/ym4jWlTq7Pu/hyaIbjQrbKH3B4PSBaiNnZclRzufnqFtbr5PIADIrixO9CFu9ybvB
+BR2emt92ODkEFN59uSKwHlkO98BtpiT5zlLFcFPq6LamvQzSuAV2TxGPVzFu/rq/sMr57EjSX6d
Fdz7xzuj/rw9/5gjYkNUQ5pqJzvpx5wuMqSOVXizkeSSe/gAZnYwoXwoUf3jXO4AAz3VZRCldDp5
4zWr67pqtyaPLMra6DfGnxBxxOqr85nA2qZAT86hXjOe3E00lgtBdft8oyj494MiwtkhAGK2J8bg
cWRq31bSjAwcQj2CTRSVCgA71Ojt2wHLFRnPrwJajjrQ3BvvnikWXOnZsFgfvFLBDgjfQaBeOCnW
xQ7G3Q8GY1IFyVxG8tlrn66xzfdlY22QK0KenIJhrg6zDbBmCu+xnDfvOczNeW6BGWARKxHW/gSB
xCv/+1dL+8wxc4k6kxOLcJXFq6WPoRGAqvwJqJSns4yiMDvjpHGrmTV7YurUpuZpQOdXEWP96CVH
dqX4KWRp42xhhc5OI6KepvDbIdobKI6xW95ZJ2LCKbEn4OkLzDStXfKJHGyccOes5s2pvFnz5fPv
Bf7gIoo5E0/14L9mM9nF/Nkpl6N3qCtgPEtaNb9blNa4rDHXTDVPwvmYl9VTM0H4eEihwufOMkvi
YQo2jHleumeKOwHSJju40ecWR3iY5D4a4fp1+yIq0eYS4nncRLPQcWqifZkzNG4T6oN+OhiBJAaC
V/jq7a+48gIlCkLYuwYAJPPd3d4CkuoS6Xz0Wd3uHFTzZHrzCHRVeEnWX0sVyAK2oOmpcbBsQycb
11dNv9vaGWaDfnHEhCaBEgB26PsmV71XyDX/XF9/vSuiSCN91ai1mCN2d7uY1DNKtGvLlhPgJjUD
bFXkla83LG5/jP6A1xAKfXicbYwnE9PeJbo/VFeBChwbmPPGdbKAJlCs4dFhKg7HN7FRcCuw33df
vsDuXxXAhc+YoWBcqaEpntNua6dWmfVYOvrl7RBCDMFw9ffJQcIUfFOnRGOzNSi/nlEiD9RN7q8g
xB9JakRb2v8g2qA8Mz+kEjKfW4FfWjUbPj8IHKlHCWae866Hi4Vqqkit9PQjWL+YMzT4+GCgDd7Z
d73Fcci6Cka5Zg7Y+BjpEti/ZKazq7gc5MNyWUYnTC9A/u+/NZKZWPgVYnuEP6HrTZSTm3vLIiH4
/f79sdTjCWxB/5PnLtnLXs87mQlz74wcpf7NK2FyOZ3dyouAMXZy111/GZ163WmMWELCaF5mUtoV
3/alFjV15T01nE7U3SYT/wRE6vkCU9fVlbtw7BjBifNNgZiksK6XgQAB00==
```

FIG. 15

PUBLICLY ACCESSIBLE DELIVERY CONFIRMATION SYSTEM FOR VIRTUAL DIGITAL DOWNLOAD ITEMS

CROSS-REFERENCE TO RELATED APPLICATIONS

This application claims the benefit of provisional patent application Ser. No. 61/069,507, filed 2008 Mar. 14 by the present inventor.

FEDERALLY SPONSORED RESEARCH

Not Applicable

SEQUENCE LISTING OR PROGRAM

Not Applicable

BACKGROUND

1. Field of Invention

This invention relates to a digital delivery confirmation system utilizing a master server machine, slave server machines, private client machines, and public client machines that are mutually connected to each other through a computer network, which confirms the delivery of digital items from a slave server machine to a private client machine using background network communications between a master server machine and private server machine providing publicly accessible delivery confirmation status through a master server machine to public client machines.

2. Prior Art

With the rapid expansion of technology, transferring digital content from one machine to another machine has become a common occurrence. Virtual digital content includes but is not limited to intellectual property, digital music, computer software, cell phone ring tones, documents, video, and images. With the delivery of virtual digital content comes a risk to vendors and intellectual property rights owners from potential fraud in false claims of items not received reported to credit card companies and other intellectual rights organizations, primarily due to not having a method to prove that the virtual digital item has been delivered to a client. There is not a known, existing publicly accessible third-party system to protect rights owners and authorized vendors with proof that a digital item has been delivered to a client.

Delivery confirmation exits for physically delivered products through third-party physical delivery companies such as UPS, Federal Express, and the USPS using physical markings on packages and various manual and automated scanning technologies. These physical delivery confirmation systems provide publicly accessible confirmation of physical item delivery. Delivery confirmation of physical items provides the sender with proof that a physical item has been delivered to its destination. Existing physical delivery confirmation methods do not work with digital items due to the lack of physical attributes of virtual items. In an open client/server environment, the server stores digital content on a digital storage medium, and the remote client obtains a copy of the digital content from the server over a network using variants of the HTTP and FTP protocols using the TCP/IP network protocol. The software tools available in the open client/server environment can detect and potentially correct errors in the transmission of digital content such as in RFC 793—Transmission Control Protocol, RFC 959—File Transfer Protocol, and RFC 2616—Hypertext Transfer Protocol which detect when the transfer of the digital content has been completed, but only in respect to transmission control and potential error correction of the data being sent. These protocols lack the ability to provide a direct mechanism to provide stand-alone publicly accessible delivery confirmation status of digital items.

Existing open source and commercial digital delivery software systems provide delivery of digital content using the HTTP and FTP protocols, but focus on pre-delivery requirements i.e. payment, or providing information, and delivery of the content by hiding the storage origin of the digital items to prevent digital theft. These systems only provide a mechanism to deliver a digital item to the end client, and protect the intellectual property of the digital content from being downloaded without authorization by the rights owner or authorized vendor. These software systems do not provide publicly accessible third party confirmation of delivery.

Systems that use a client plug-in, or other client side solution to provide delivery confirmation such as U.S. Pat. No. 6,823,366 (2004) to Nakano requires software to be installed on the client system before obtaining a digital item. Not all receiving client systems can utilize a plug-in method. Some clients are not capable of installing plug-ins due to restricted software installation schemes, or system hardware/software limitations or incompatibility issues. This solution does not work for all cases of digital item delivery confirmation.

Closed point-to-point delivery confirmations such as U.S. Pat. No. 6,477,243 (2002) to Choksi et al. using facsimiles have the advantage of a point-to-point closed, controlled delivery and receipt mechanism and defined protocol through the PTSN telephone network. Digital items delivered through the HTTP and FTP protocols over the Internet do not have the same closed, direct connection characteristics used by the telephone network. This method does not provide publicly accessible third party confirmation of delivery and is unsuitable for digital items.

SUMMARY

The present invention provides a method and system for confirming the delivery of a digital item from a slave server to a private client using delivery confirmation request software to obtain unique delivery confirmation codes from a master server, and delivery agent software which performs delivery of digital items and notifies the master server when delivery is complete. In addition, a public client is able to access the master server at any point of the delivery process to query the current status of an existing delivery confirmation code to confirm the delivery status of a digital item.

In accordance with one embodiment, a digital delivery confirmation method and system utilizing a master server consisting of one or many replicated computer systems containing and executing delivery confirmation generation software, delivery confirmation status update software, slave server account management software, and status records of delivery confirmation codes; slave servers consisting of one or many individual computer systems containing and executing delivery confirmation number request software, and delivery agent software; private clients consisting of download receiving software; public clients consisting of web accessible software to access and view delivery confirmation status' from the master server.

DRAWINGS

1. Figures

FIG. 15 shows an encoded and encrypted code segment.

2. REFERENCE NUMERALS

Figure 1:
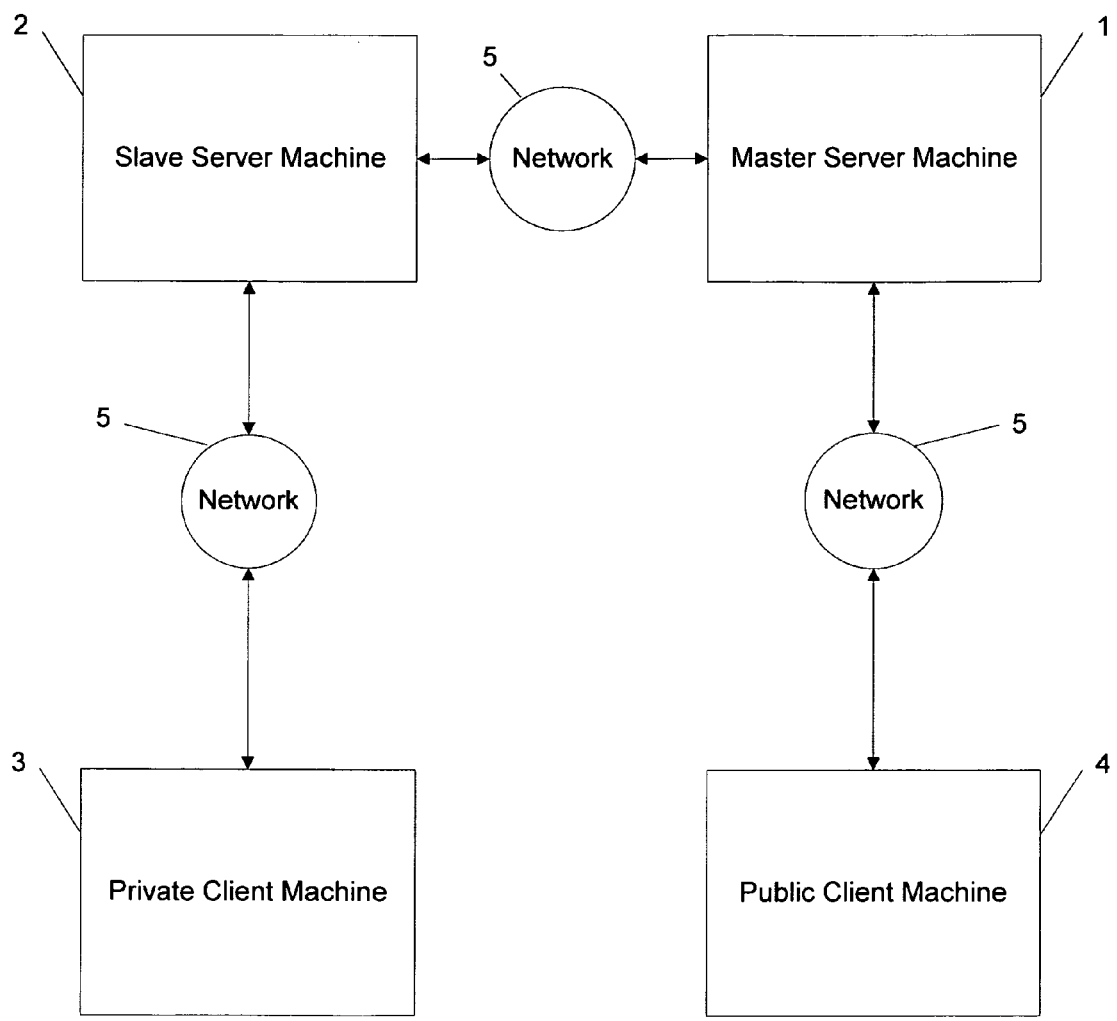
FIG. 1 shows an overview of the delivery confirmation system containing all main components of the system.

1 Master Server
2 Slave Server
3 Private Client
4 Public Client
5 Network
6 Relational Database System (RDBMS)
7 Delivery Confirmation Generation Software
8 Delivery Confirmation Update Software
9 Delivery Confirmation Status Query Software
10 Slave Server Account Management Software
11 Network Interface
12 WWW Server Software
13 Delivery Confirmation Request Software
14 Download Delivery Agent Software
15 HTTP Accessible Software
16 Digital Storage Medium
18 Generate a New Delivery Confirmation Code Entry Point
19 Check for Valid Slave Server Account
20 Verify Valid Slave Server Account
21 Generate a Unique Delivery Confirmation Code
22 Store Confirmation Code in Database on Master Server
23 Provide Confirmation Code to Slave Server
24 End Result of Generating a New Confirmation Code
25 Notify Slave Server that Delivery Confirmation is Not Available
26 Update Confirmation Code on Master Server Entry Point
27 Check for Valid Confirmation Code
28 Notify Slave Server Delivery Confirmation Update Not Available
29 Update Delivery Confirmation Code in Database on Master Server
30 Notify Slave Server the Confirmation Code Has Been Updated
31 End Result of Confirmation Code Update
33 Public Client Confirmation Code Query Entry Point
34 Public Client Request for Status of Delivery Confirmation Code
35 Master Server Retrieves Delivery Confirmation Details from Database
36 Verify Confirmation Code Exists
37 Master Server Presents Delivery Confirmation Code Status to Public Client
38 End Result of Public Client Query
39 Master Server Notifies Public Client that Confirmation Code Not Available
40 Initiate Delivery Entry Point
41 Slave Server Requests Delivery Confirmation Code from Master Server
45 Receive Delivery Confirmation Code from Master Server
46 Verify Delivery Confirmation Number has been Received
47 Generate Method to Download with Delivery Confirmation Code
48 Present Generated Download Method to Private. Client
49 End Result of Initiating Delivery
50 Delivery Confirmation Unavailable
51 Generate Method to Download without Delivery Confirmation Code
52 Perform Delivery of Digital Item Entry Point
53 Private Client Initiates Download Process
54 Slave Server Sends Data Packet to Private Client
55 Determine if All Bytes Have Been Sent to Private Client
56 Determine if the end user has aborted the download
57 Determine if the network connection of the slave server and private client has been lost
58 Aborted or Connection Lost Exit Point
59 Determine if the download method generated has delivery confirmation
60 Notify the Master Server that All Bytes Have Been Sent
61 Get size in bytes of digital item to deliver
62 Remove queued confirmation from the update queue
64 Receive Confirmation Status Update Result
65 Determine if the status update has been received from the master server
66 Determine if there are queued delivery confirmation codes
67 Update queued delivery confirmation codes on master server
68 Place the current delivery confirmation code into the update queue
69 End result of performing delivery of a digital item
70 Third-party pre-delivery confirmation generation software
71 Third-party pre-delivery authorization software

DETAILED DESCRIPTION

FIGS. 1-8—Preferred Embodiment

The preferred embodiments of the present invention will now be described in detail below with reference to the accompanying drawings.

First Preferred Embodiment

FIG. 1 is a hardware configuration of the first embodiment of the present invention. As shown in FIG. 1, a master server 1, a slave server 2, a private client 3, and a public client 4 are connected through a network 5 such as a LAN, WAN, Internet or the like. The master server machine 1, and slave server machine 2 are constructed of a general-purpose computer, such as a personal computer, a workstation, or a server-class computing machine. The private client machine 3, and public client machine 4 are constructed of a general-purpose computer, workstation, server-class computing machine, a cellphone, or other network accessible device.

That is, the master server 1, slave server 2, private client 3, and public client 4 are equipped with a digital storage medium (not shown in the figure), such as a computer hard drive, storage card, a central processing unit (not shown in the figure), memory (not shown in the figure), communications interface (not shown in the figure), and methods for manual user input and output (not shown in the figure) such as a keyboard, keypad, mouse, and display device.

The master server 1, slave server 2, private client 3, and public client 4 have an internal structure similar to one another respectively, however, the software stored and executed on each of the respective machines is different.

Figure 2:
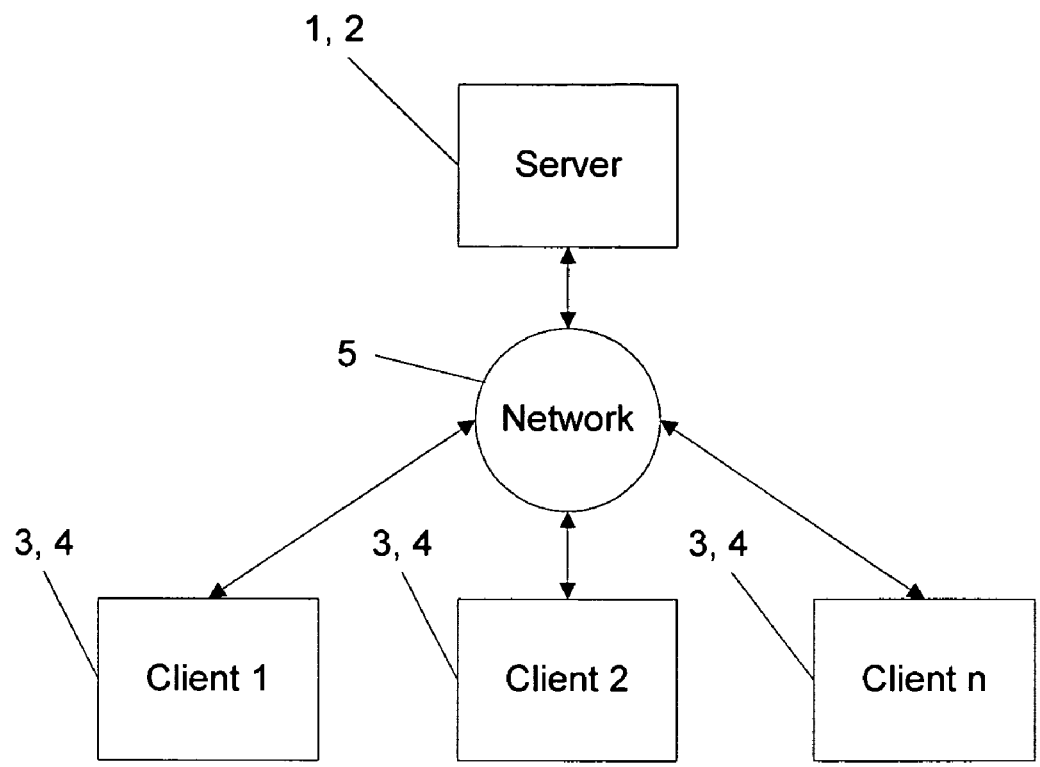
FIG. 2 shows the relationship of server and client machines communicating through a network.

The ability of the preferred embodiment in regard to the master server machine 1 and slave server machine 2 to serve multiple private client machines 3 and public client machines 4 through a computer network 5 is shown in FIG. 2.

Figure 3:
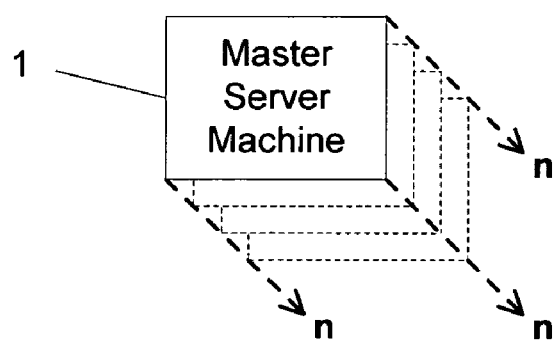
FIG. 3 shows the expansion capability of a master server machine by replication.
Figure 4:
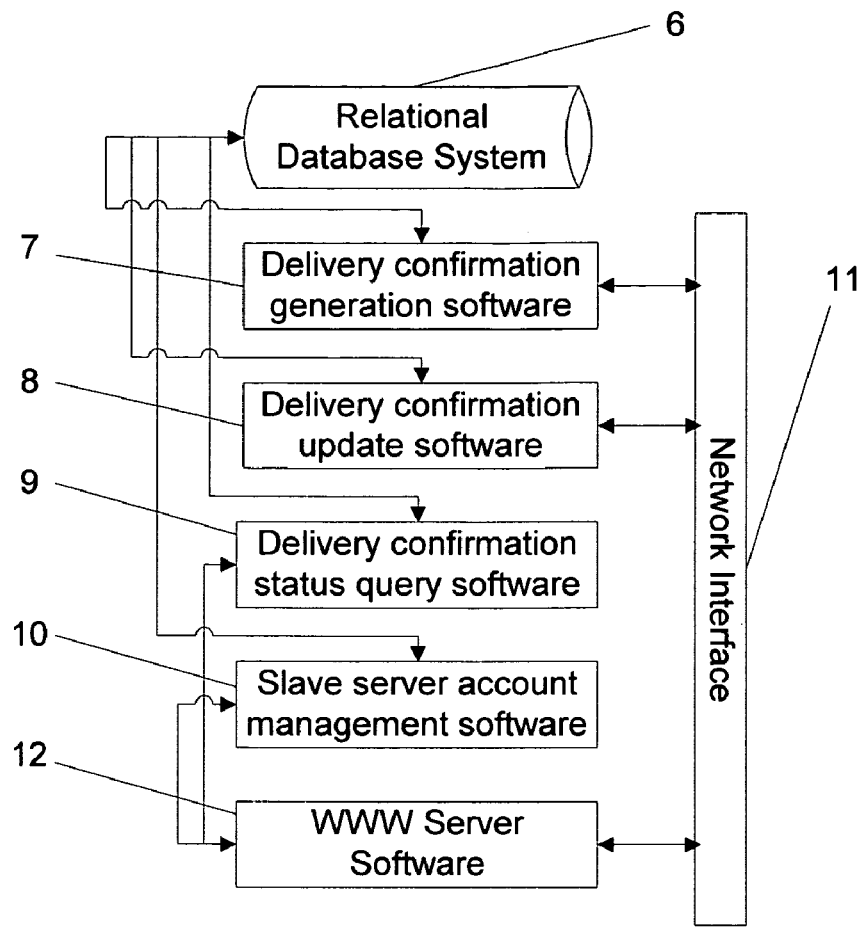
FIG. 4 shows the components of the master server machine.

The master server machine 1 can consist of multiple replicated machines and act as a single entity is shown in FIG. 3.

The software configuration of this preferred embodiment will now be explained in detail below. First, a software configuration of the master server 1 is explained in detail with reference to FIG. 4. The software of the master server machine 1 include an operating system (OS) (not shown in the figure), world wide web (WWW) server software 12, a relational database system (RDBMS) 6, delivery confirmation generation software 7, delivery confirmation update software 8, delivery confirmation status query software 9, and slave server management software 10.

Based on the transmit control protocol/internet protocol (TCP/IP), the delivery confirmation generation software 7, and the delivery confirmation update software 8 communicate through a secure socket layer (SSL) network connection with the external network 5 machines through the network interface 11 of the master server machine 1.

Based on the hyper text transport protocol (HTTP) and TCP/IP, the delivery confirmation status query software 9, and slave server management software 10 communicate through a WWW server 12 with the external network 5 machines through the network interface 11 of the master server machine 1.

Figure 5:
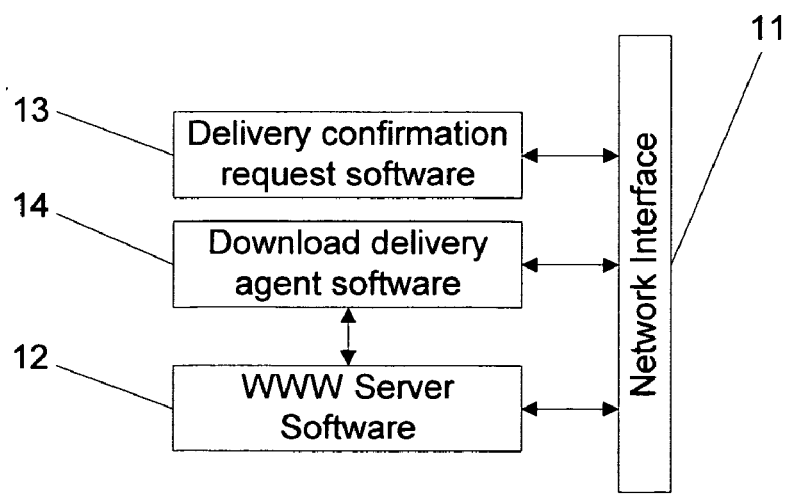
FIG. 5 shows the components of the slave server machine.

Next, a software configuration in the slave server machine 2 is explained with reference to FIG. 5. The software of the slave server machine 2 includes an OS (not shown in the figure), encoded delivery confirmation request software 13, encoded download-delivery agent software 14, and a WWW server 12. Encoded software on the slave server machine 2 is computer software that is encrypted to prevent modification or tampering of the internal software code and associated processes.

Based on the TCP/IP protocol, the delivery confirmation request software 13 communicates via an SSL network connection between the master server machine 1 and the slave server machine 2 using the external network 5 through the network interface 11 of the slave server 2. Based on the HTTP and TCP/IP protocols, the download delivery agent software 14 communicates with the private client machine 3 using the network interface 11 through the external network 5 for delivery of a digital item. When the delivery of the digital item is complete, the slave server machine 2 communicates with the master server machine 1 via an SSL network connection through the network interface 11 over the external network 5 to update the digital items delivery status.

Figure 6:
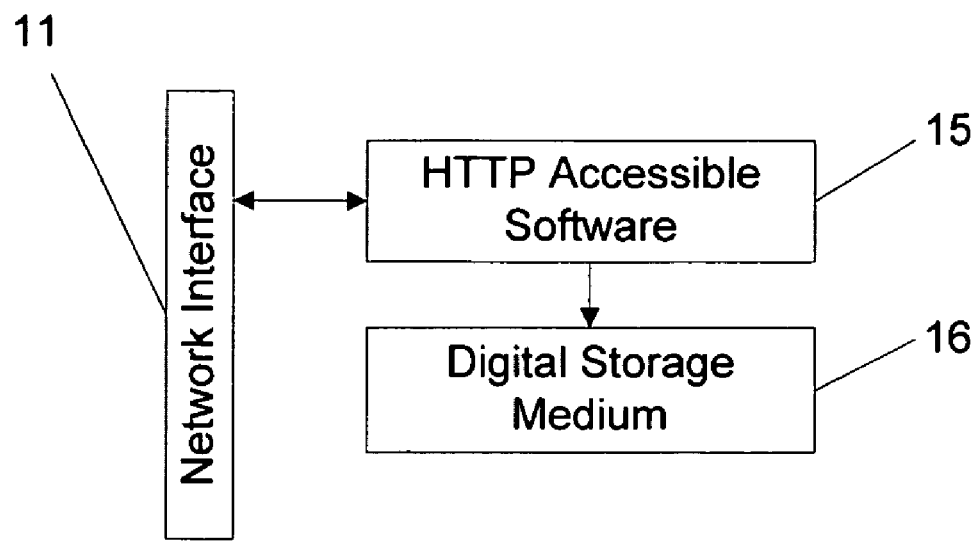
FIG. 6 shows the components of the private client machines.

Next, a software configuration in the private client machine 3 is explained with reference to FIG. 6. The software of the private client machine 3 includes an OS (not shown in the figure), HTTP accessible software 15, such as a web browser or downloads manager with a pre-defined method of storing a digital item onto a digital medium 16 through or in the private client machine 3.

Based on the HTTP and TCP/IP protocols, the HTTP accessible software 15 communicates via the network interface 11 over the external network 5 to the slave server machine 2 to initiate the delivery of a digital item, which resides on or is accessible to the slave server machine 2. Once communication is established between the private client machine 3 and the slave server machine 2 the digital item is copied over the network 5 from the slave server machine 2 onto the private client machines 3 digital storage medium 16.

Figure 7:
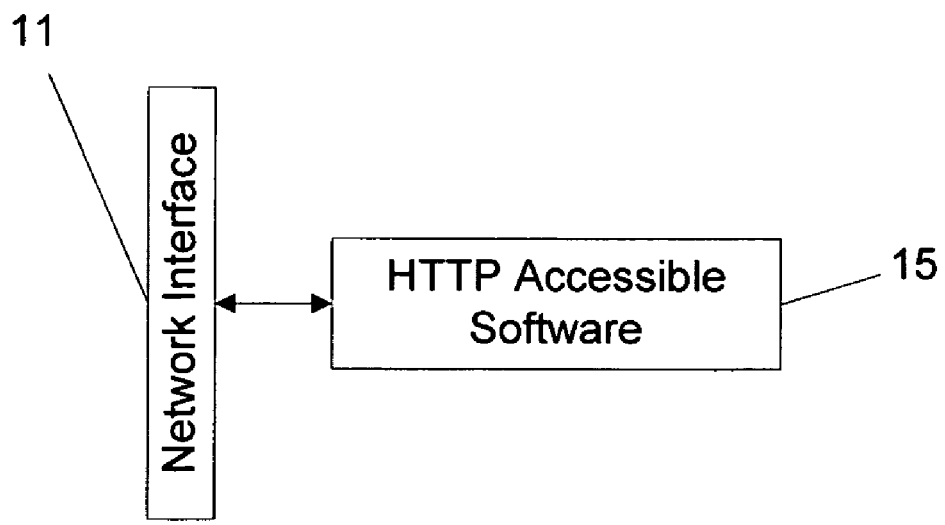
FIG. 7 shows the components of the public client machines.

Next, a software configuration in the public client machine 4 is explained with reference to FIG. 7. The software on the public client machine 4 includes an OS (not shown in figure), and HTTP accessible software 15 such as a web browser.

Based on the HTTP and TCP/IP protocols, the HTTP accessible software 15 communicates via the network interface 11 of the public client machine 4 through the external network 5 to the master server machine 1 to query the status of a predefined delivery confirmation code.

Figure 8:
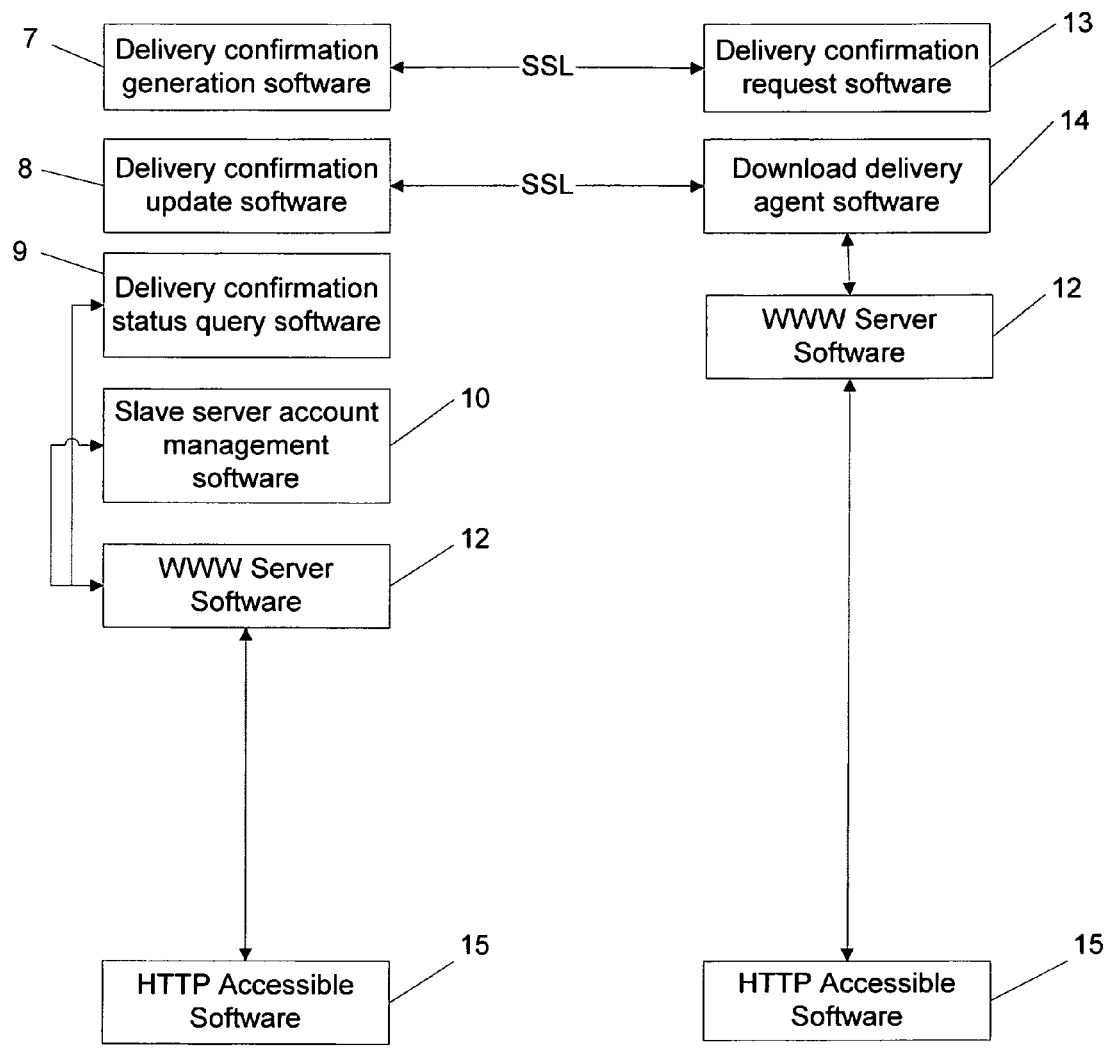
FIG. 8 shows the communication paths of the components of the master server machine, the slave server machine, the private client machine, and the public client machine.

Next, the software communication channel components are explained with reference to FIG. 8. The delivery confirmation generation software 7 communicates exclusively with the delivery confirmation request software 13 via an SSL network connection using the TCP/IP protocol. The download delivery agent software 14 communicates with the delivery confirmation update software 8 via an SSL network connection using the TCP/IP protocol, and with the private client machine 3 through a WWW server 12 using the HTTP and TCP/IP protocols to the HTTP accessible software 15. The delivery confirmation query software 9, and the slave server account management software 10 communicate through a WWW server 12 with the HTTP accessible software 15 on the public client machine 4 using the HTTP and TCP/IP protocols.

Operation—FIGS. 9-15

The manner and use of the present invention will now be described in detail below with reference to the accompanying drawings.

The delivery confirmation process starts with a private client machine 3 communicating with a slave server machine 2 to obtain a copy of a digital item. The slave server machine 2 then securely communicates with the master server machine 1 to obtain a unique delivery confirmation code. Once the slave server machine 2 receives the unique delivery confirmation code, it creates and provides a method for the private client machine 3 to download a copy of the digital item. After the private client machine 3 receives the download method from the slave server machine 2, the private client machine 3 initiates the download delivery of the digital item, for example, by clicking on a hypertext markup language (HTML) link. Once the download is initiated, the slave server machine 2 monitors the delivery of the digital item to the private client machine using the encoded download delivery agent software 14. When the slave server machine 2 has determined that all bytes of data have been delivered to the private client machine 3 the slave server machine 2 communicates securely with the master server machine 1 informing that the download for the delivery confirmation code provided has been completed. The master server machine 1 then updates the status of the delivery confirmation code of the item delivered using the delivery confirmation update software 8. The master server machine 1 then informs that slave server machine 2 of the results of the status update.

A public client machine 4 can access the master server machine 1 at any point in the delivery process to view the status of any given delivery confirmation code using the delivery confirmation query software 9. In addition, a public client machine 4 connects to the master server machine 1 to access, modify, or create a slave server account using the slave server account management software 10.

Figure 9:
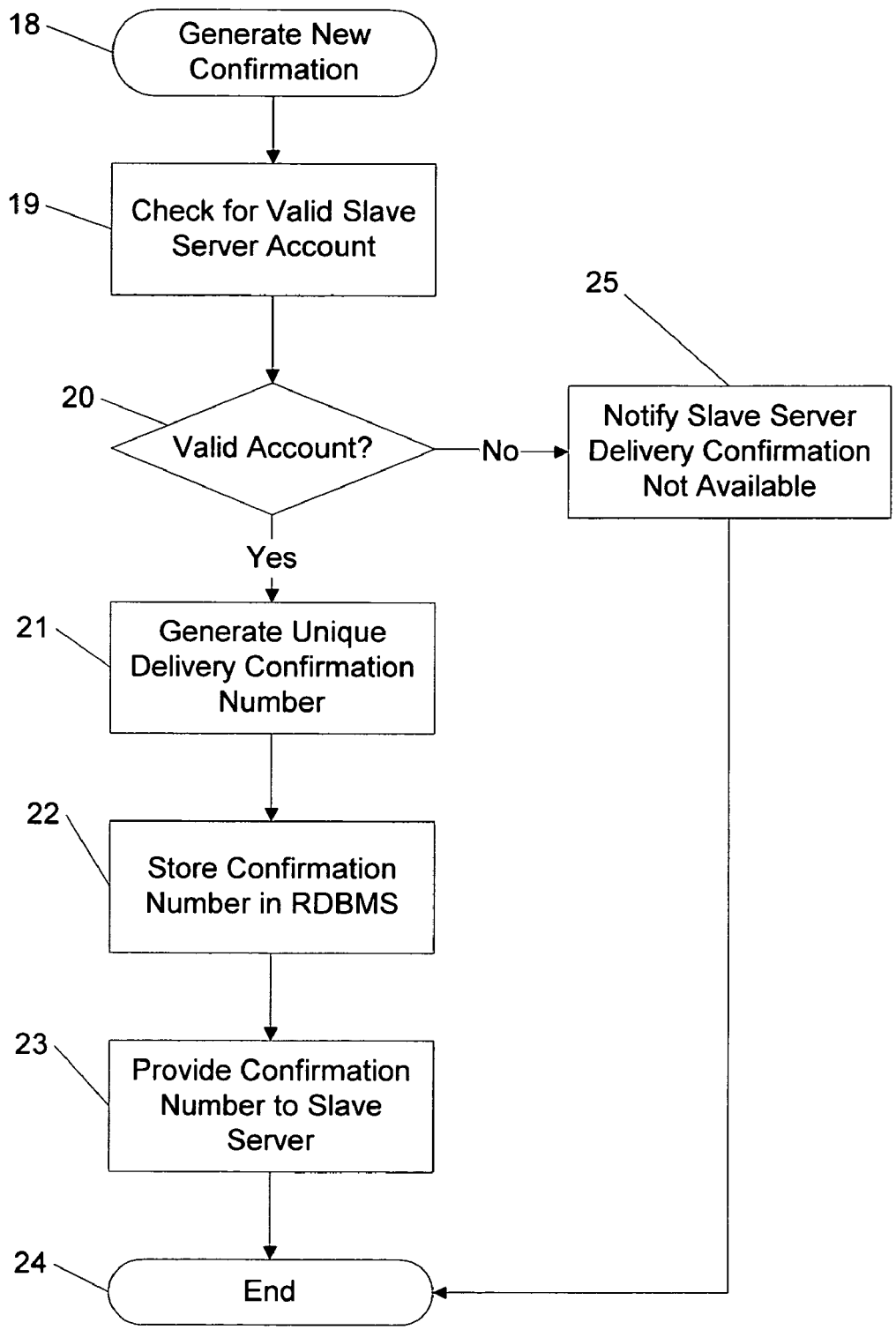
FIG. 9 shows the process flow of generating a confirmation code on the master server machine.

The master server machine 1 is responsible for the generation of, update of, storage of, and publicly accessible status display of confirmation codes. FIG. 9 shows the process flow of the delivery confirmation generation software 7 installed on the master server machine 1. To generate a new confirmation code 18 the software first checks for a valid slave server account 19 for the slave server machine 2 that is making the request. If a valid slave server account exists 20 a unique delivery confirmation code is generated 21, stored in the RDBMS 22 of the master server machine 1, and then securely provided to the slave server machine 2 making the request 23. If an invalid slave server account is provided 20, no delivery confirmation code is generated and the slave server machine 2 making the request is notified that delivery confirmation is not available 25.

Figure 10:
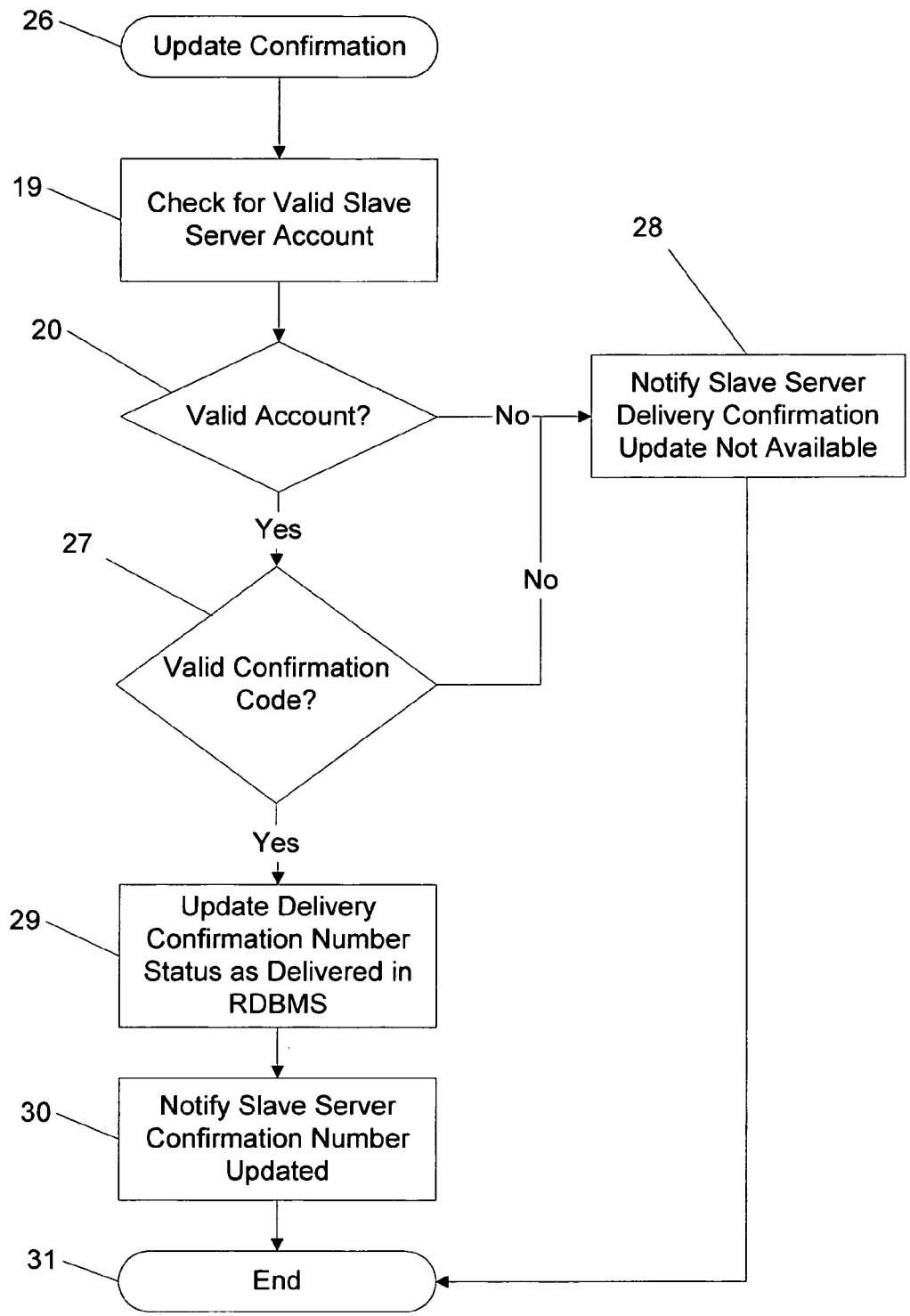
FIG. 10 shows the process flow of updating the status of a confirmation code on the master server machine.

FIG. 10 shows the process flow of the delivery confirmation update software 8 installed on the master server machine 1. To update a pre-existing delivery confirmation code 26, the software first checks for a valid slave server account 19 for the slave server machine 2 that is making the request. If a valid slave server account exists 20 a check is made to determine if a valid delivery confirmation code has been provided 27. If a valid delivery confirmation code has been provided, the provided delivery confirmation code is updated in the RDBMS 29 and the slave server is securely notified that the update has been completed 30. If an invalid slave server account 20, or an invalid delivery confirmation code 27 is provided, the slave server machine 2 making the request is securely notified that no delivery confirmation updates are available 28.

Figure 11:
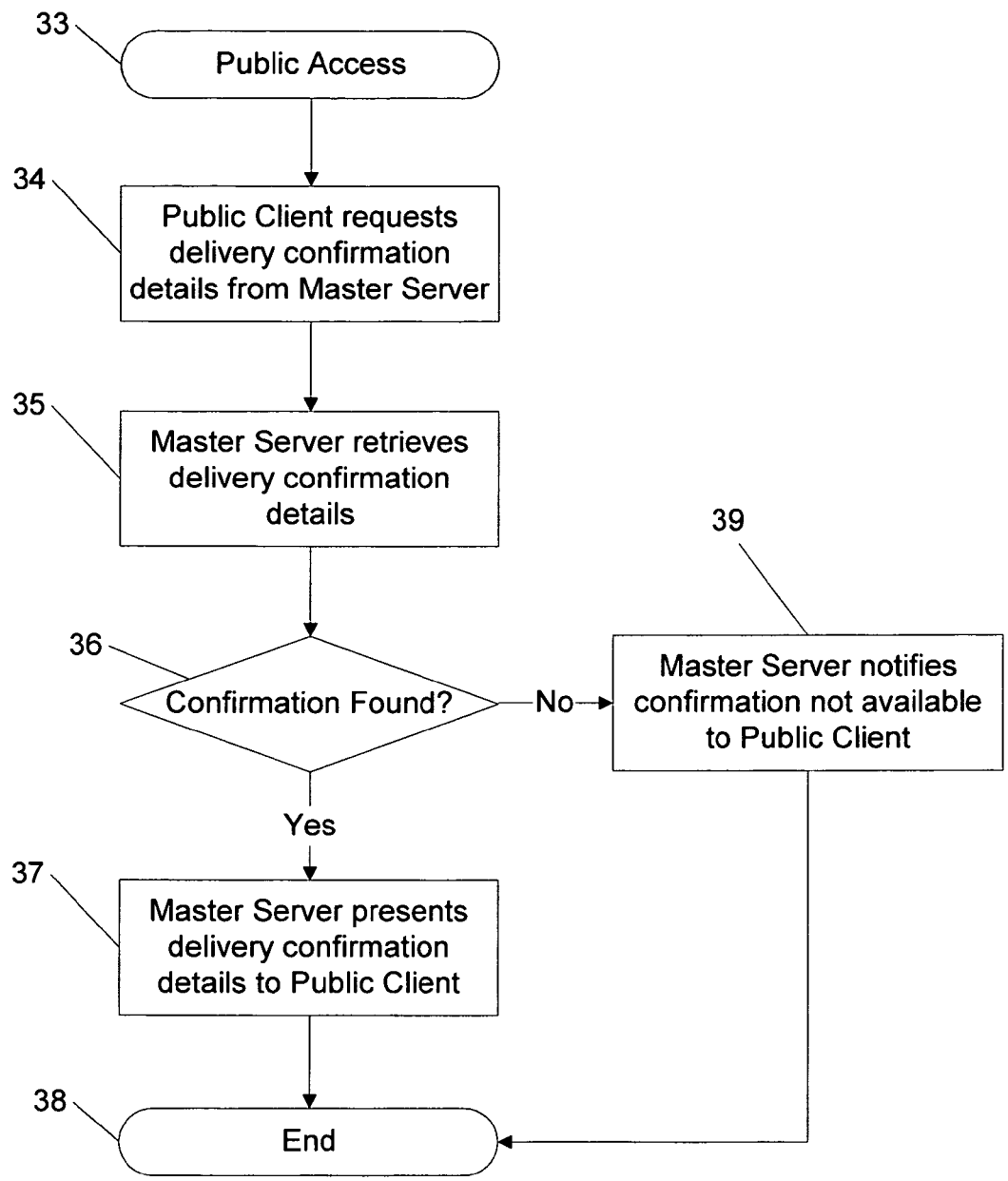
FIG. 11 shows the process flow of providing delivery confirmation status from the master server machine to a public client machine.

FIG. 11 shows the process flow of the delivery confirmation query software 9 installed on the master server machine 1. A public client machine 4 communicates with the master server machine 1 to obtain the current status of a publicly accessible 33 delivery confirmation code. The public client machine 4 provides a delivery confirmation code and requests its current status 34. The details of the delivery confirmation code is retrieved from the database 35 and if found 36 the master server machine 1 presents that status 37 of the provided delivery confirmation code to the public client machine 4. If the delivery confirmation code provided by the public client machine 4 does not exist 36, the master server machine 1 notifies the public client machine 4 that delivery confirmation is not available for the delivery confirmation code provided 39.

The slave server machine 2 is responsible for obtaining delivery confirmation codes from the master server machine 1, generating a download delivery method for a private client machine 3, monitoring the delivery of digital items to private client machines 3, and notifying the master server machine 1 when all bytes of a digital item have been delivered to a private client machine 3.

Figure 12:
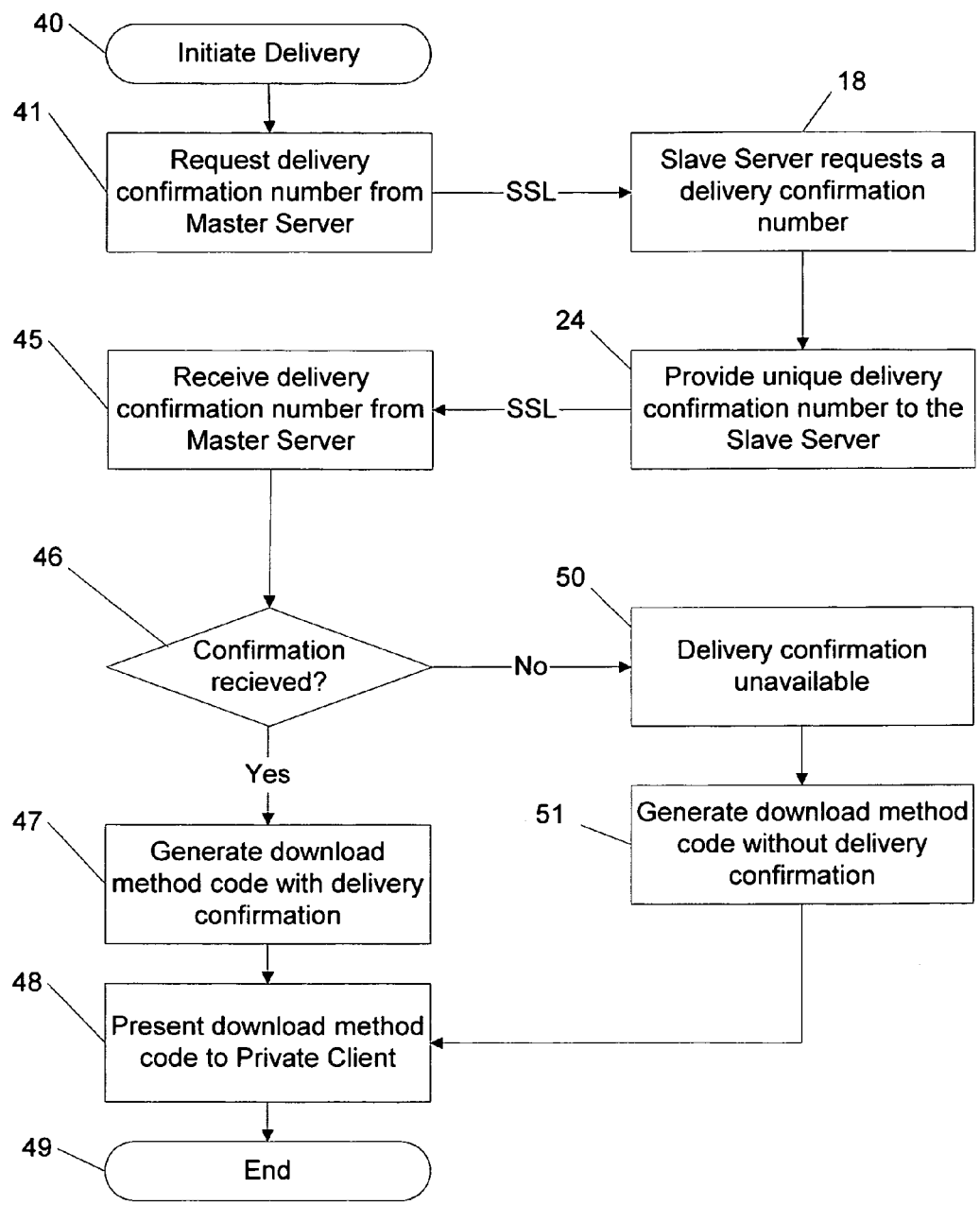
FIG. 12 shows the process and communications flow of obtaining a delivery confirmation code on the slave server machine through the master server machine.

FIG. 12 shows the process flow of the encoded delivery request software 13 installed on the slave server machine 2. A private client machine 3 initiates a delivery request 40 of a digital item from a slave server machine 2. The slave server machine 2 then securely communicates with the master server machine 1 requesting a delivery confirmation code 41. The master server machine 1 receives the request to generate a new delivery confirmation code 18, and securely provides a unique delivery confirmation code 24 to the requesting slave server machine 2. The slave server machine 2 then securely receives the delivery confirmation code 45 from the master server machine 1. If a confirmation code is received 46 a download method code with delivery confirmation is generated 47 and provided to the private client machine 48. If a delivery confirmation number is not received 46 delivery confirmation is not available 50 and download method code is generated without delivery confirmation capability 51 and presented 48 to the private client 3.

Figure 13:
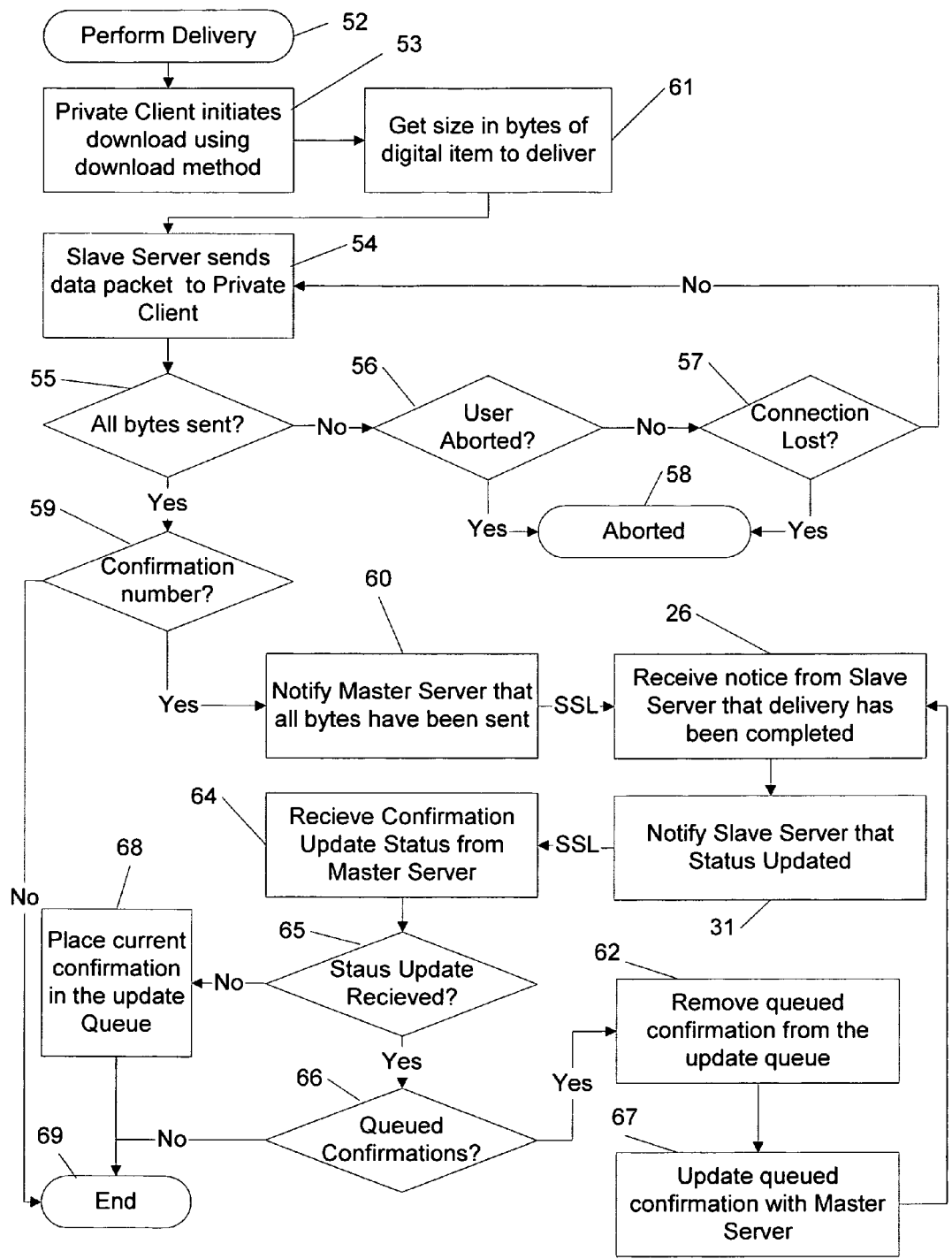
FIG. 13 shows the process flow of delivering a digital item from a slave server machine to a private client machine in relation to the master server machine.

FIG. 13 shows the process flow of the encoded download delivery agent software 14 installed on the slave server machine 2. The encoded download delivery agent software 14 uses a queuing method to store and later send failed delivery confirmation code updates 26 to the master server machine 1. The queuing method is used to ensure that in the event of a network 5 connectivity or master server machine 1 failure that delivery confirmation codes will be updated, not in real-time, but after the failure has been resolved. After the download method code is created and presented to the private client machine 3, the private client machine 3 requests delivery of the digital item 52 and initiates the delivery process 53 using the download method code previously provided 49. The slave server machine 2 obtains the size in bytes of the data to be sent 61 and then sends data packets of the digital item 54 monitoring the delivery process as it progresses. If not all bytes of the digital item have been sent 55, and the user has not aborted the download process 56 and the network connection between the slave server machine 2 and private client machine 3 has not been lost 57, continue to send the digital item packets 54. If the download process is aborted 56 by the private client machine 3 or the network connection 57 between the slave server machine 2 and the private client machine 3 is lost, abort the download process 58; no delivery confirmation status updates with the master server machine 1 is done. If all bytes of the digital item have been sent 55 a check is made to see if a delivery confirmation code was part of the download method code. If a delivery confirmation code is present, the master server machine 1 is securely notified that all bytes have been sent 60 for the confirmation code provided. The master server machine 1 securely receives the notice from the slave server machine 2 that delivery of all bytes has been completed 26 and then securely notifies the slave server machine 2 of the update status for the delivery confirmation code 31. The slave server machine 2 then securely receives the status update 64 from the master server machine 1. If a status update is received for the delivery confirmation code 65, a check is made to see if there are any failed delivery confirmation code updates in the slave server machine 2 update queue 66. If there are no queued delivery confirmations 66, delivery confirmation with the master server machine 1 is complete. If delivery confirmation codes exist in the update queue 66 each queued confirmation code is sequentially removed from the update queue 62, and securely updated with the master server machine 67. If a failure occurs in regard to network 5 connectivity or with the master server machine 1, the delivery confirmation code destined for an update on the master server machine 1 is placed into the update queue 68 on the slave server machine 2 for later processing.

Figure 14:
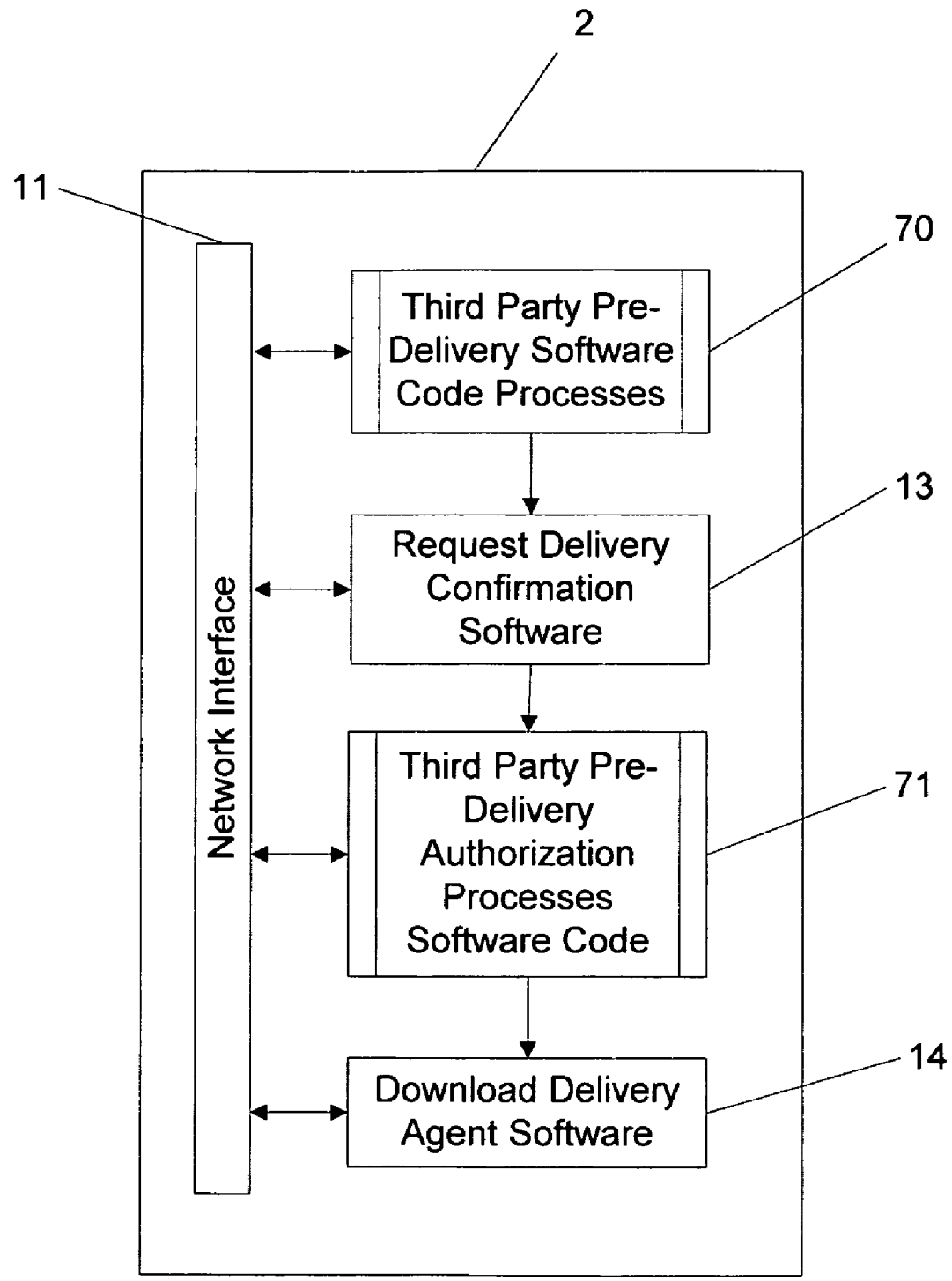
FIG. 14 shows integration of third party digital delivery software on a slave server using this delivery confirmation solution.

The encoded download delivery agent software 14 and the encoded delivery request confirmation software 13 are used as an encoded application-programming interface (API) integrated with existing third-party download delivery scripts as shown in FIG. 14. To integrate and use the present invention on the slave server machine 2 using third-party code, the encoded delivery request confirmation software 13 is used between the third-party pre-delivery processes 70, and the pre-delivery authorization processes 71 sections of the code. Once the third-party code has executed past the pre-delivery authorization process code 71, the encoded download delivery agent software 14 is called to deliver the digital item.

As shown in FIG. 15, encoded software on the slave server machine 2 is computer software that is encrypted to prevent modification or tampering of the internal software code and associated processes.

ADVANTAGES

From the description above, a number of advantages of some embodiments of my digital delivery confirmation system become evident:
(a) No third-party software is required to be installed on a private client machine 3 to confirm the delivery of a digital item.
(b) The digital delivery confirmation system can be integrated with existing download delivery software.
(c) Any public client machine 4 can view the status of a delivery confirmation code.
(d) No manual intervention is required to obtain or update delivery confirmation codes.
(e) The software code on the slave server machine is encoded and encrypted to prevent modification or tampering.
(f) The system utilizes fault-tolerant delivery confirmation code updates between the slave server machine and the master server machine to ensure valid confirmations are updated.

CONCLUSION, RAMIFICATIONS, AND SCOPE

The above-described embodiment may be applied to various business transactions, such as order processing and approval operations, which are conducted in a company, other organization, or private party that requires a method to prove delivery of a digital item.

According to the present invention, as constructed above, a slave server machine 2 can confirm whether contents sent from the slave server machine 2 are properly received by an intended private client machine 3. In other words, the slave server machine 2 monitors the bytes sent, and network 5 connection status to a private client machine 3 and automatically transmits delivery confirmation data indicating the receipt of the contents to the master server machine 1 only when all contents have been delivered to the private client machine 3. Accordingly, the slave server machine 2 can confirm the delivery of the contents without any operations by the private client machine 3 other than the private client machine 3 initiating the download process. The master server machine 1 contains the status and details of all delivery confirmations in the system, which can be publicly accessed through the public client machine 4 at any point in the delivery process, thus providing third-party delivery confirmation of digital items.

Although the description above contains much specificity, these should not be construed as limiting the scope of the embodiment but as merely providing illustrations of some of the presently preferred embodiments. For example, the relational database system 6 shown in FIG. 2 can be located on the internal storage medium of the master server machine 1 as shown in the figure, or on an external storage area network (SAN) (not shown in the figure). In addition, it is possible for the public client machine 4 and the private client machine 3 to be the same computer system. Further, the system can operate without the use of slave server account management software 10; the delivery protocol used by the download delivery agent software 14 can use the file transfer protocol (FTP) instead of the HTTP protocol; the digital storage medium 16 of the private client machine 3 can be stored onto the local machine or on external network 5 storage devices. A licensing method could be integrated within the delivery confirmation request software 13 and/or the download delivery agent software 14 to further enhance slave server 2 code usage.

Thus the scope of the embodiment should be determined by the appended claims and their legal equivalents, rather than by the examples given.

I claim:

1. A method of confirming the delivery of digital items comprising:
(a) generating a unique delivery confirmation code from a master server machine,
(b) storing said delivery confirmation code in a digital medium on said master server machine,
(c) providing said delivery confirmation code to delivery confirmation request software from said master server machine to a slave server machine,
(d) providing a download method to an external network enabled device using said delivery confirmation code from said slave server machine,
(e) monitoring said download method between said slave server machine and said network enabled device to determine that all bytes have been sent from said slave server machine to said network enabled device,
(f) providing an update of said delivery confirmation code to delivery confirmation update software on said master server machine from said slave server machine,
(g) providing public access using delivery confirmation query software to view delivery confirmation status from external public client machines on said master server machine.

2. A machine confirming the delivery of digital items comprising:
(a) a master computer consisting of delivery confirmation code generation software, which generates unique delivery confirmation codes,
(b) said master computer using a storage method for storing said delivery confirmation codes,
(c) said master computer consisting of delivery confirmation code update software,
(d) said master computer consisting of public accessible delivery confirmation code query software,
(e) a slave computer consisting of delivery confirmation request software where network communication is done exclusively with the said master computer to obtain said unique delivery confirmation codes, (f) a slave computer consisting of delivery agent software where network communication is done exclusively with the said master computer to update said delivery confirmation codes, (g) a private computer consisting of file transfer capable software where network communication is done with the said slave computer using delivery agent software to transfer a digital item from said slave computer to said private computer, (h) a public computer consisting of web accessible software where network communication is done with the said master computer and said public computer to obtain said delivery confirmation codes status.

* * * * *